US010372292B2

(12) United States Patent
Vogel et al.

(10) Patent No.: US 10,372,292 B2
(45) Date of Patent: Aug. 6, 2019

(54) SEMANTIC ZOOM-BASED NAVIGATION OF DISPLAYED CONTENT

(71) Applicant: MICROSOFT TECHNOLOGY LICENSING, LLC, Redmond, WA (US)

(72) Inventors: Matthew Vogel, Seattle, WA (US); Avijit Sinha, Newcastle, WA (US); Olivier Destrebecq, Seattle, WA (US); Sayim Kim, Seattle, WA (US); Robert Strong, Seattle, WA (US); Ronald Di Sandro, Redmond, WA (US); William Vong, Hunts Point, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 28 days.

(21) Appl. No.: 13/801,747

(22) Filed: Mar. 13, 2013

(65) Prior Publication Data

US 2014/0281868 A1    Sep. 18, 2014

(51) Int. Cl.
*G06F 3/048* (2013.01)
*G06F 3/0481* (2013.01)
(Continued)

(52) U.S. Cl.
CPC ........ *G06F 3/04817* (2013.01); *G06F 3/0483* (2013.01); *G06F 3/04883* (2013.01);
(Continued)

(58) Field of Classification Search
CPC .. G06F 3/0483; G06F 3/0485; G06F 3/04817; G06F 3/0481; G06F 3/04883;
(Continued)

(56) References Cited

U.S. PATENT DOCUMENTS 5,416,895 A * 5/1995 Anderson et al. ............ 715/209
7,327,349 B2   2/2008 Robbins et al.
(Continued)

FOREIGN PATENT DOCUMENTS

CN     102955655 A      3/2013
WO   2012/141048 A1   10/2012

OTHER PUBLICATIONS

International Search Report and Written Opinion for PCT/US2014/020287 dated Jul. 10, 2014.
(Continued)

*Primary Examiner* — Stephen S Hong
*Assistant Examiner* — Hope C Sheffield
(74) *Attorney, Agent, or Firm* — Merchant & Gould P.C.

(57) ABSTRACT

Semantic zoom based navigation may be used to navigate content, such as content related to spreadsheets. Different gestures (e.g. pinch/stretch, pan, swipe) may be used while navigating the content. For example, while viewing data from a particular sheet in a workbook a pinch gesture may be received that changes the displayed content to a thumbnail view showing thumbnails that each represent a different sheet within the workbook. A gesture may also be received to change a view of an object. For example, a user may perform a stretch gesture near an object (e.g. a chart, graph, . . . ) that changes the current view to a view showing underlying data for the object. A user may also perform a gesture (e.g. a stretch gesture) on a portion of a displayed object that changes the current view to a view showing the underlying data for a specific portion of the object.

19 Claims, 11 Drawing Sheets

(51) Int. Cl.
  *G06F 17/24* (2006.01)
  *G06F 3/0488* (2013.01)
  *G06F 3/0483* (2013.01)
(52) U.S. Cl.
  CPC .......... *G06F 17/246* (2013.01); *G06F 3/0481* (2013.01); *G06F 2203/04806* (2013.01); *G06F 2203/04808* (2013.01)
(58) Field of Classification Search
  CPC ......... G06F 17/246; G06F 2203/04806; G06F 2203/04808
  See application file for complete search history.

(56) References Cited

U.S. PATENT DOCUMENTS

| | | | |
|---|---|---|---|
| 7,441,207 B2* | 10/2008 | Filner et al. | 715/864 |
| 2007/0192739 A1* | 8/2007 | Hunleth | G06F 3/0481 715/823 |
| 2007/0263007 A1 | 11/2007 | Robotham et al. | |
| 2008/0288894 A1* | 11/2008 | Han et al. | 715/855 |
| 2009/0089707 A1* | 4/2009 | Knowles | G06F 3/0481 715/800 |
| 2010/0083179 A1* | 4/2010 | Decker et al. | 715/830 |
| 2011/0163971 A1* | 7/2011 | Wagner et al. | 345/173 |
| 2011/0316884 A1 | 12/2011 | Giambalvo et al. | |
| 2012/0030568 A1* | 2/2012 | Migos | G06F 3/0486 715/702 |
| 2012/0180002 A1 | 7/2012 | Campbell et al. | |
| 2012/0254783 A1* | 10/2012 | Pourshahid | G06F 3/04883 715/771 |
| 2012/0327009 A1 | 12/2012 | Fleizach | |
| 2013/0047080 A1* | 2/2013 | Kroeger et al. | 715/273 |
| 2013/0080884 A1 | 3/2013 | Lisse et al. | |
| 2013/0275904 A1* | 10/2013 | Bhaskaran | G06F 3/048 715/771 |
| 2014/0006988 A1 | 1/2014 | Yamamura et al. | |
| 2014/0032482 A1* | 1/2014 | Dulaney | G06F 17/30056 707/607 |

OTHER PUBLICATIONS

"Google spreadsheets on your iPhone and iPad", Retrieved on: Feb. 7, 2013, pp. 2, Available at: http://support.google.com/drive/bin/answer.py?hl=en&answer=2761244.

"Navigator Mobile", Retrieved on: Feb. 7, 2013, pp. 2, Available at: http://www.bentley.com/en-US/Free+Software/Navigator+Mobile.htm.

"Designing great productivity apps for Windows (Windows)", Retrieved on: Feb. 7, 2013, pp. 27, Available at: http://msdn.microsoft.com/en-us/library/windows/apps/hh868273.aspx.

"International Preliminary Report on Patentability Issued in PCT Application No. PCT/US2014/020287", dated Jul. 13, 2015, 8 Pages.

"First Office Action & Search Report Issued in Chinese Patent Application No. 201480014247.7", dated Oct. 11, 2017, 18 pages.

* cited by examiner

SEMANTIC ZOOM-BASED NAVIGATION OF DISPLAYED CONTENT

BACKGROUND

Navigation within in a document can be difficult. For example, when navigating spreadsheet data it may take a long time for a user to navigate to the portion of the spreadsheet he or she is interested in viewing. Navigating on a mobile computing device having a smaller display may be even more challenging.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Semantic zoom based navigation may be used to navigate content, such as content related to spreadsheets. Different gestures (e.g. pinch/stretch, swipe, double tap, and the like) may be used while navigating the content. The gestures may be used to zoom into content, zoom out from the content, as well as pan the displayed content. For example, while viewing data from a particular sheet in a workbook a pinch gesture may be received that changes the displayed content to a thumbnail view showing thumbnails that each represent a different sheet within the workbook. A particular thumbnail may be selected (e.g. tap gesture/stretch gesture) to zoom into the selected sheet and show the data for the selected sheet. A gesture may also be received to change a view of an object. For example, a user may perform a stretch gesture near an object (e.g. a chart, graph, . . . ) that changes the current view to a view showing underlying data for the object. A user may also perform a gesture (e.g. a stretch gesture) on a portion of a displayed object that changes the current view to a view showing the underlying data for a specific portion of the object.

DETAILED DESCRIPTION

Figure 1:
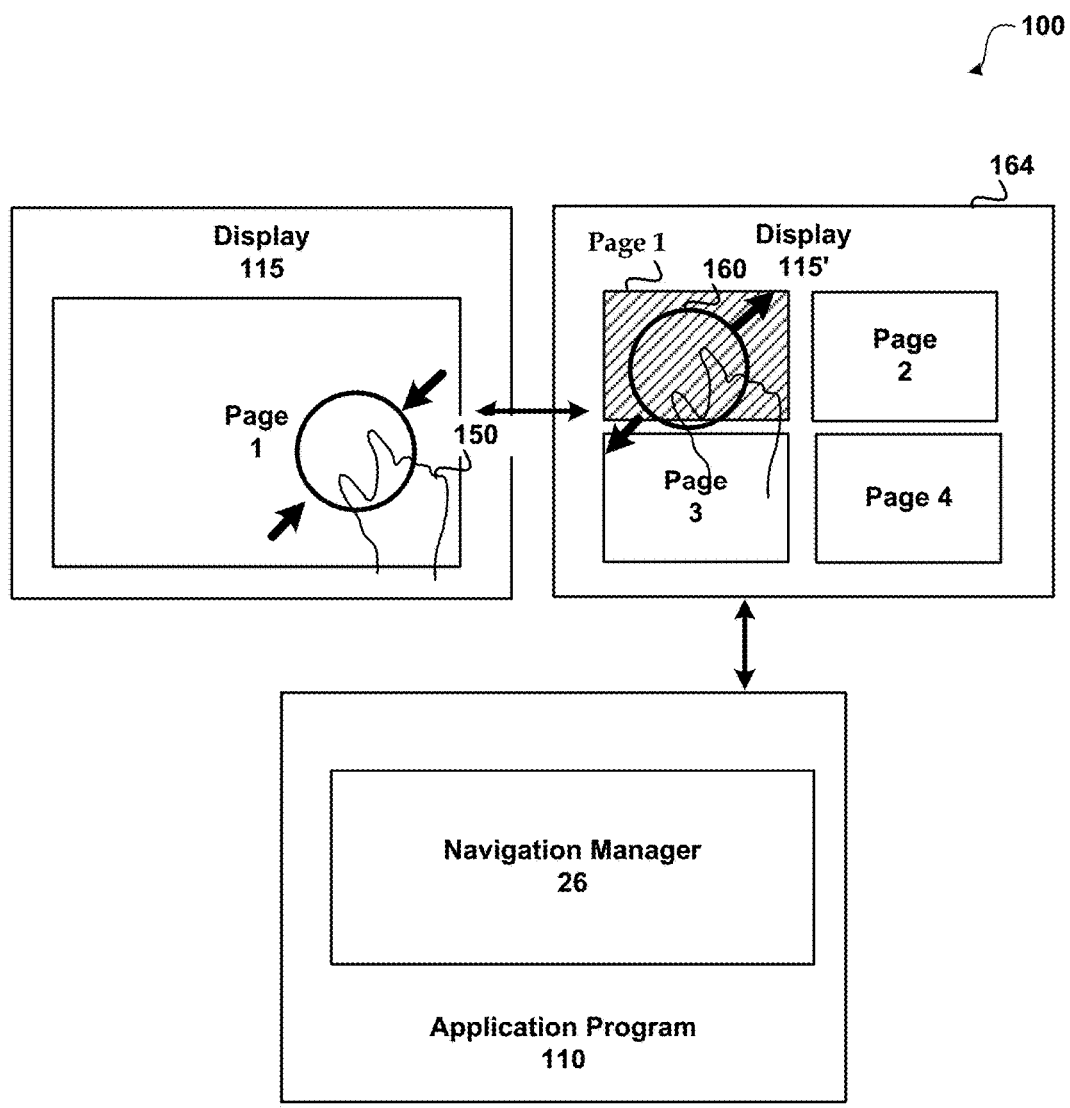
FIG. 1 shows a system for semantically navigating content.

Referring now to the drawings, in which like numerals represent like elements, various embodiment will be described.

FIG. 1 shows a system for semantically navigating content. As illustrated, system 100 includes application program 110, navigation manager 26 and touch screen input device/display 115.

In order to facilitate communication with the navigation manager 26, one or more callback routines, may be implemented. According to an embodiment, application program 110 is a business productivity application, such as a spreadsheet application, that is configured to receive input from a touch-sensitive input device 115 and/or keyboard input (e.g. a physical keyboard and/or SIP) and/or other types of input (e.g. speech and/or some other input sensing). For example, navigation manager 26 may provide information to application 110 in response to a user's gesture (i.e. gesture 150). For example, gestures may include, but are not limited to: a pinch gesture; a stretch gesture; a select gesture (e.g. a tap action on a displayed element); a select and hold gesture (e.g. a tap and hold gesture received on a displayed element); a swiping action and/or dragging action and/or double tap; and the like.

System 100 as illustrated comprises a touch screen input device/display 115 that detects when a touch input has been received (e.g. a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micromachined accelerometers, piezoelectric devices, capacitive sensors, resistive sensors, inductive sensors, laser vibrometers, and LED vibrometers.

Navigation manager 26 is configured to semantically navigate content, such as spreadsheet content. Different gestures (e.g. pinch/stretch, swipe) may be used while navigating the content. The gestures may be used to zoom into content, zoom out from content, as well as pan the displayed content. In response to receiving an instruction to change the current view (e.g. a pinch gesture as indicated by gesture 150), navigation manager 26 zooms out, zooms in, and/or pans the content. In the current example, a user performs a pinch gesture that is showing page 1 of a document (e.g. data for a sheet of a workbook) on display 115. In response to receiving the pinch gesture, navigation manager 26 instructs a display of thumbnails (e.g. a thumbnail represents a sheet of the workbook) as shown in display 115'. The thumbnail view may be shown immediately upon receiving a gesture that is associated with entering the overview mode or may be entered using information in addition to receiving the gesture. For example, when the pinch gesture moves the zoom level below a predetermined zoom threshold (e.g. 50%, 55%, 60% . . . ) the thumbnail view may be entered. Similarly, navigation manager 26 may exit the thumbnail view in response to different events (e.g.

stretch gesture changing zoom level above predetermined threshold, selecting a thumbnail (e.g. tap gesture)).

While in the thumbnail view, content is displayed as thumbnails such that a user may more easily locate content. In the current example, four thumbnails are initially displayed when the overview mode is entered in response to receiving the pinch gesture on Page 1. For example, each page may relate to a different sheet within the workbook. Navigation manager 26 may change the number of thumbnails displayed while in the overview mode (e.g. receiving a pinch/stretch gesture). The thumbnails displayed may also be adjusted (e.g. up/down/left/right) using gestures (e.g. drag, swipe . . . ). A stretch gesture 160 may be received to move back to the data view as illustrated in display 115. A thumbnail may also be selected (e.g. tapped) to return to the original data viewing mode and to display the content of the selected thumbnail. For example, while viewing data from a particular sheet in a workbook a pinch gesture may be received that changes the displayed content to a thumbnail view showing thumbnails that each represent a different sheet within the workbook.

A gesture may also be received to change a view of an object. For example, a user may perform a stretch gesture near an object (e.g. a chart, graph, . . . ) that changes the current view to a view showing underlying data for the object. A user may also perform a gesture (e.g. a stretch gesture) on a portion of a displayed object that changes the current view to a view showing the underlying data for a specific portion of the object. More details regarding the overview mode are provided below.

Figure 2:
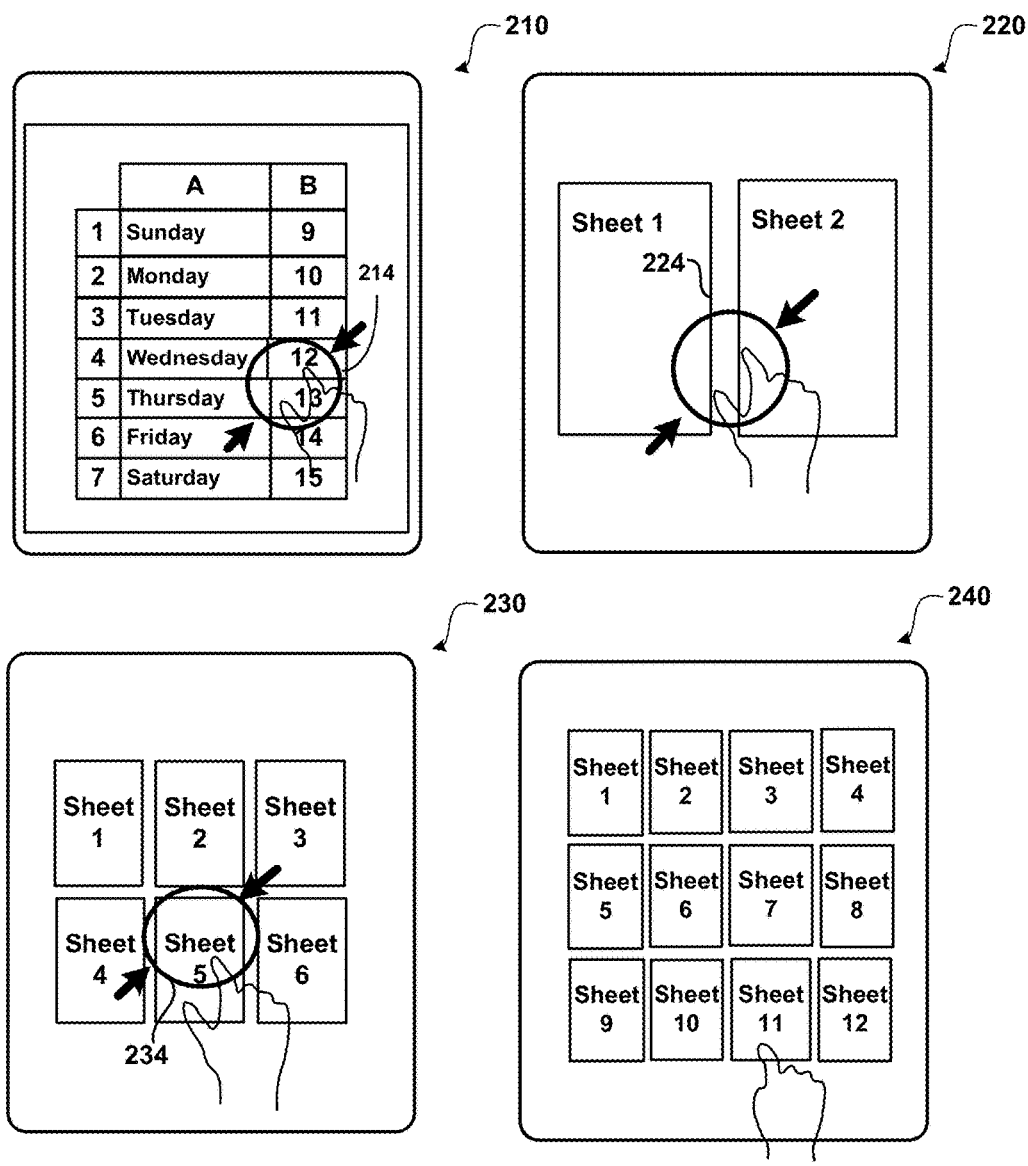
FIG. 2 shows entering an thumbnail view and changing a number of thumbnails displayed.

FIG. 2 shows entering an thumbnail view and changing a number of thumbnails displayed. As illustrated, FIG. 2 includes four different displays (210, 220, 230 and 240) that illustrate entering the thumbnail view and displaying thumbnails. The displays may be shown on displays having a standard/large display (e.g. displays larger than 12 inches) as well as a device having a limited display size (e.g. a cell phone having a display of approximately 2 by 3 inches, a slate/tablet having approximately a 7-10 inch display, and/or other devices having other display sizes (e.g. 4, 5, 6, . . . ). The displays may also be shown on a touch screen.

Display 210 shows a display of content (e.g. spreadsheet data) before a thumbnail view is entered. In the current example, the user performs a pinch gesture 214 by pulling together his or her index finger and thumb to create a pinching action in order to enter the thumbnail view. As a result of the pinch gesture, the thumbnail view is entered and one or more thumbnails are displayed that provide the user with more displayed content associated with the workbook.

In the current example, two thumbnails representing different sheets of a workbook are initially shown in the display as illustrated by display 220. More thumbnails may be initially displayed. According to an embodiment, each thumbnail represents a sheet of a spreadsheet workbook. According to another embodiment, each thumbnail represents a portion of the content (e.g. 50%, 33%, 16% and the like). The content that is displayed in the thumbnail may be a zoomed out view of the content without changing the actual content, a zoomed out view of a modified view of the content, and/or a representation of the content. When there are larger thumbnails displayed, the content may actually be a zoomed out view of the content. As there are more thumbnails displayed in the view and the thumbnails are smaller, the level of detail in the thumbnail changes. For example, when a bar chart is converted into a thumbnail that occupies roughly half of a limited display device, the display is a zoomed out view without changing the content displayed in the thumbnail. When the size of the thumbnail goes down further, the actual content, which is a chart in this example, is replaced with a graphical icon replacing the content.

Display 230 shows more thumbnails being displayed in response to receiving another pinch gesture 224 as illustrated in display 220. In the current example, the number of thumbnails increased to six thumbnails. The number of thumbnails that are displayed may be changed using other increments (e.g. 2 to 4, 2 to 8, 2 to 3, and the like).

Display 240 shows more thumbnails being displayed in response to receiving another pinch gesture 234 as illustrated in display 230. In the current example, the number of thumbnails increased to twelve thumbnails.

Figure 3:
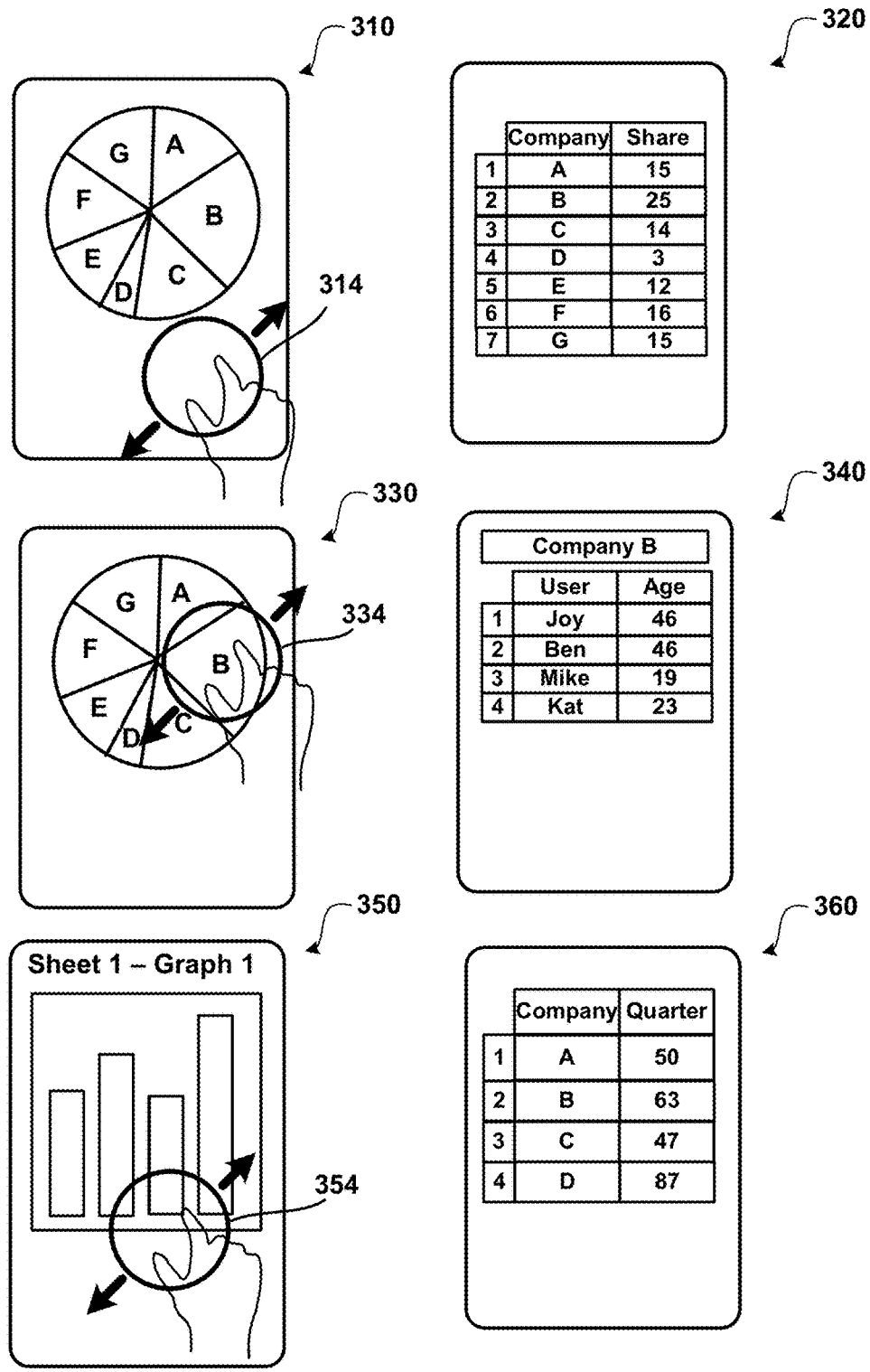
FIG. 3 shows using semantic zoom based navigation to interact with an object.

FIG. 3 shows using semantic zoom based navigation to interact with an object. As illustrated, FIG. 3 includes six different displays (310, 320, 330, 340, 350 and 360) that illustrate receiving a stretch gesture to display data related to the object.

Display 310 shows a display of a chart object (e.g. a pie chart). In the current example, the user performs a stretch gesture 314 by parting his or her index finger and thumb to create a stretching action in order to enter the data view. As a result of the stretch gesture performed near the chart (but not within a segment of the chart), the underlying data for the chart is displayed as illustrated by display 320.

Display 330 shows a display of a chart object (e.g. a pie chart). In the current example, the user performs a stretch gesture 334 in order to enter the data view. As a result of the stretch gesture performed within a segment of the chart, the underlying data for the segment of the chart where the gesture is received is displayed as illustrated by display 340.

Display 350 shows a display of a chart object (e.g. a column chart). In the current example, the user performs a stretch gesture 354 in order to enter the data view. As a result of the stretch gesture performed near the chart (but not within a bar of the chart), the underlying data for the chart is displayed as illustrated by display 360.

Figure 4:
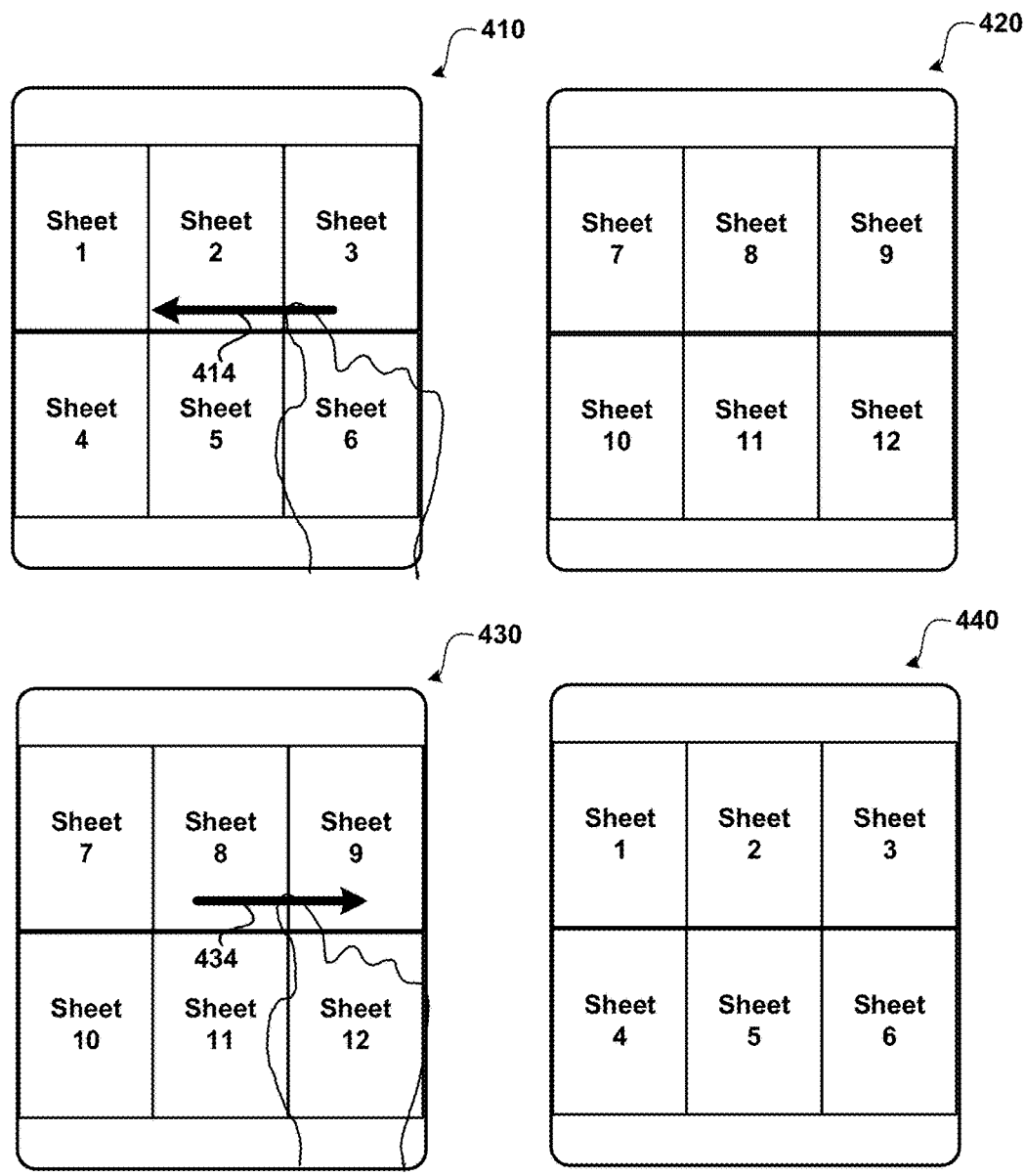
FIG. 4 shows panning content.

FIG. 4 shows panning content. As illustrated, FIG. 4 includes four different displays (410, 420, 430 and 440) that illustrate panning displayed content.

Display 410 shows a display of a portion of sheets of a spreadsheet. In the current example, the user performs a move gesture 414 (e.g. pan/swipe/flick) moving his or her finger to the left. As can be seen in display 420, the six thumbnails displayed are changed to sheets 7-12 instead of sheets 1-6. While the illustrated example shows moving from sheets 1-6 to 7-12 in response to the move gesture, the move gesture may be implemented in a more continuous manner (e.g. show sheets 1-6, then 3-8, then 5-10, then 7-12, and the like). While not shown, an upward move gesture may be used to change the display of the thumbnails (e.g. sheets 1-6 to sheets 7-12).

Display 430 shows a display of a portion of sheets of a spreadsheet. In the current example, the user performs a move gesture 434 (e.g. pan/swipe/flick) moving his or her finger to the right. As can be seen in display 440, the six thumbnails displayed are changed to sheets 1-6 instead of sheets 7-12. While not shown, a downward gesture may be used to change the display of the thumbnails (e.g. sheets 7-12 to sheets 1-6).

Figure 5:
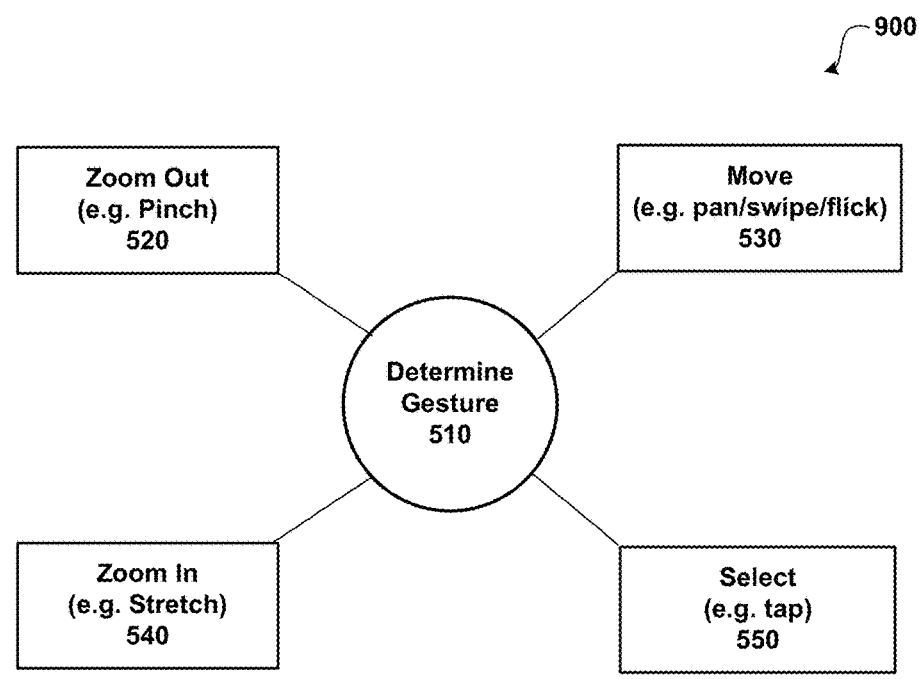
FIG. 5 shows a diagram illustrating processing different gestures during semantic navigation.

FIG. 5 shows a diagram illustrating processing different gestures during semantic navigation.

Operation 510 determines what gesture is received. According to an embodiment, the gesture may relate to zooming (e.g. zooming in, zooming out) moving (e.g. panning content) and selecting. For example, a zooming gesture may be a pinch/stretch gesture. A moving gesture may be a pan/swipe/flick gesture.

When the gesture is a pinch gesture 520 the view is changed to a zoomed out view. For example, a pinch gesture changes a spreadsheet data view to a sheet view, changes the spreadsheet data view to a chart view, increases the number of thumbnails displayed and/or moves back to a display of an object.

When the gesture is a stretch gesture 540 the view is changed to a zoomed in view. For example, a stretch gesture changes a thumbnail view to a spreadsheet data view, decreases the number of thumbnails displayed and/or moves to a data view associated with an object.

When the gesture is move gesture 530, the display of the thumbnails/data are adjusted to show an updated view. According to an embodiment, the move gesture may move the thumbnails or data in an upward direction, a downward direction, a sideways direction and a diagonal direction.

When the gesture is a select gesture 550, the data that is associated with the selected thumbnail/object is shown.

Figure 6:
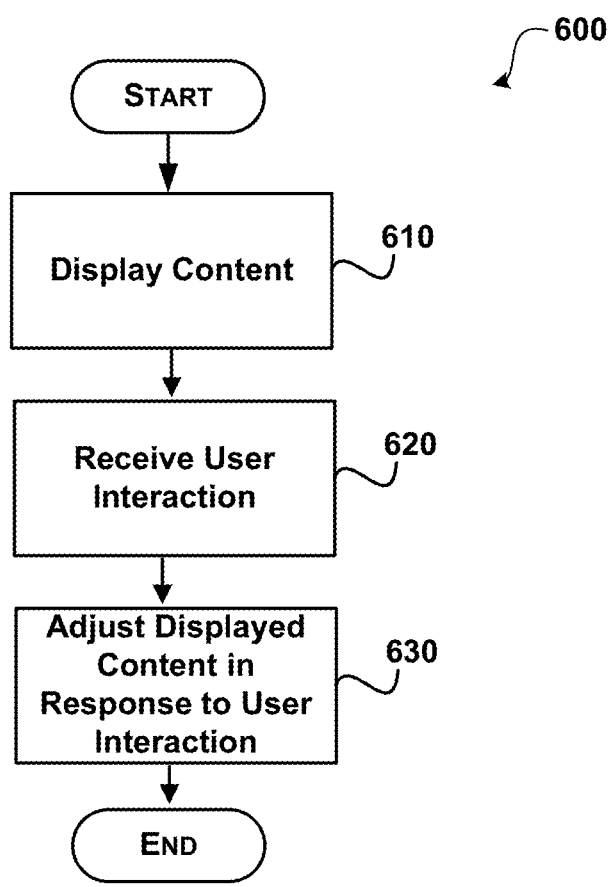
FIG. 6 shows an illustrative process for semantically navigating content.

FIG. 6 shows an illustrative process for semantically navigating content. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start operation, the process moves to operation 610, where content is displayed. The content displayed may be different types of contents. For example, the content may be a spreadsheet, a document, a presentation, images, files, and the like. According to an embodiment, the content is spreadsheet content.

Flowing to operation 620, a user interaction is received. According to an embodiment, a touch input gesture is received that may be a stretch gesture, a pinch gesture, a swipe/pan/flick gesture, and/or a select gesture. The gesture is used to navigate the displayed content.

Moving to operation 630, the displayed content is updated in response to the received gesture. For example, receiving a pinch gesture while in a data view of a spreadsheet may show a display of thumbnails that represent different sheets of a workbook. A pinch gesture may also indicate to change a number of thumbnails displayed and/or move back to an object view. Receiving a stretch gesture while in thumbnail view may move to a data view for a sheet of a workbook. A stretch gesture may also indicate to show data that is associated with an object (e.g. a portion/segment of the object, all of the data for the object). A swipe/pan/flick gesture may indicate to pan the currently displayed content. A select gesture may indicate to show a more detailed view of the selected thumbnail/object.

The process then flows to an end operation and returns to processing other actions.

Figure 7:
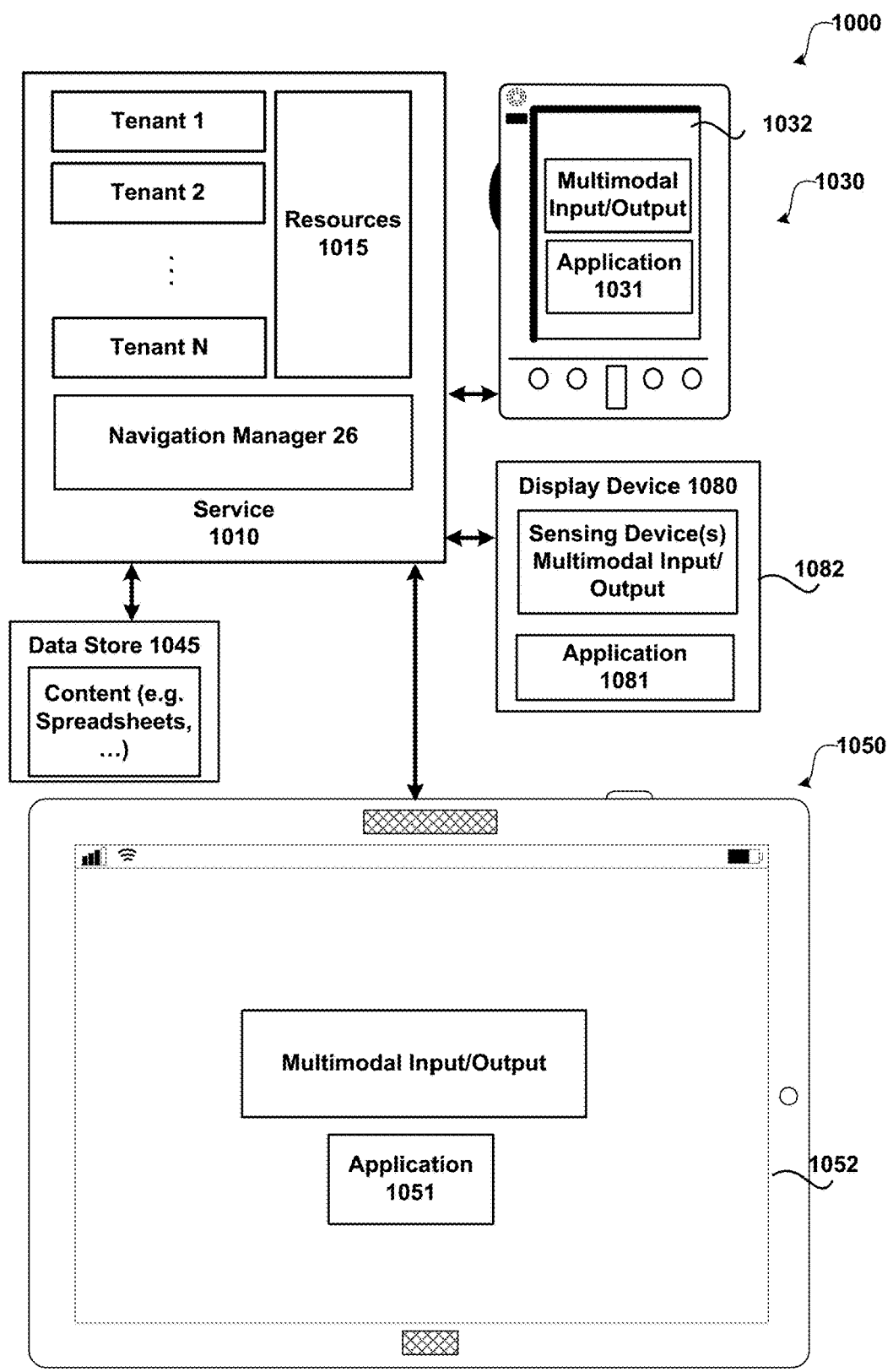
FIG. 7 illustrates an exemplary system that may use semantic zoom based navigation.

FIG. 7 illustrates an exemplary system that may use semantic zoom based navigation. As illustrated, system 1000 includes service 1010, data store 1045, touch screen input device/display 1050 (e.g. a slate), smart phone 1030, and display device 1080 (e.g. monitor/television, . . . ).

Each device (e.g. device 1050, smart phone 1030, display device) may be configured to receive input from one or more sensing devices. The sensing device may be a part of the device and/or separate from the device. The sensing device may be configured to capture user input using various input methods. A sensing device may include one or more microphones to capture spoken input (e.g. words) and one or more cameras to detect movement of a user (e.g. pictures/videos). The sensing device may also be configured to capture other inputs from a user such as by a keyboard and/or mouse (not pictured). For example, the sensing device may be a MICROSOFT KINECT® device comprising a plurality of cameras and a plurality of microphones As illustrated, service 1010 is a cloud based and/or enterprise based service that may be configured to provide spreadsheet services. The service may be configured to be interacted with using different types of input/output. For example, a user may use speech input, touch input, hardware based input, and the like. The service may provide speech output and/or sound effects. Functionality of one or more of the services/applications provided by service 1010 may also be configured as a client/server based application.

As illustrated, service 1010 is a multi-tenant service that provides resources 1015 and services to any number of tenants (e.g. Tenants 1-N). Multi-tenant service 1010 is a cloud based service that provides resources/services 1015 to tenants subscribed to the service and maintains each tenant's data separately and protected from other tenant data.

System 1000 as illustrated comprises a touch screen input device/display 1050 (e.g. a slate/tablet device) and smart phone 1030 that detects when a touch input has been received (e.g. a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

According to an embodiment, smart phone 1030, touch screen input device/display 1050 and display device 1080 are configured with multimodal applications (1031, 1051, 1081). While the application is illustrated as part of the device, the application may be a network application (e.g. included as part of service 1010) that is stored externally from the device.

As illustrated, touch screen input device/display 1050, smart phone 1030 and display device 1080 shows exemplary displays 1052/1032/1082 showing the use of an application that utilize multimodal input/output (e.g. speech/graphical displays/gestures (touch/non-touch)). Data may be stored on a device (e.g. smart phone 1030, slate 1050 and/or at some other location (e.g. network data store 1045). Data store 1054 may be used to spreadsheet data used by the service. The applications used by the devices may be client based applications, server based applications, cloud based applications and/or some combination.

Navigation manager 26 is configured to perform operations relating to performing semantic zoom based navigation as described herein. While manager 26 is shown within service 1010, the all/part of the functionality of the manager may be included in other locations (e.g. on smart phone 1030, slate device 1050 and/or display device 1080).

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 8:
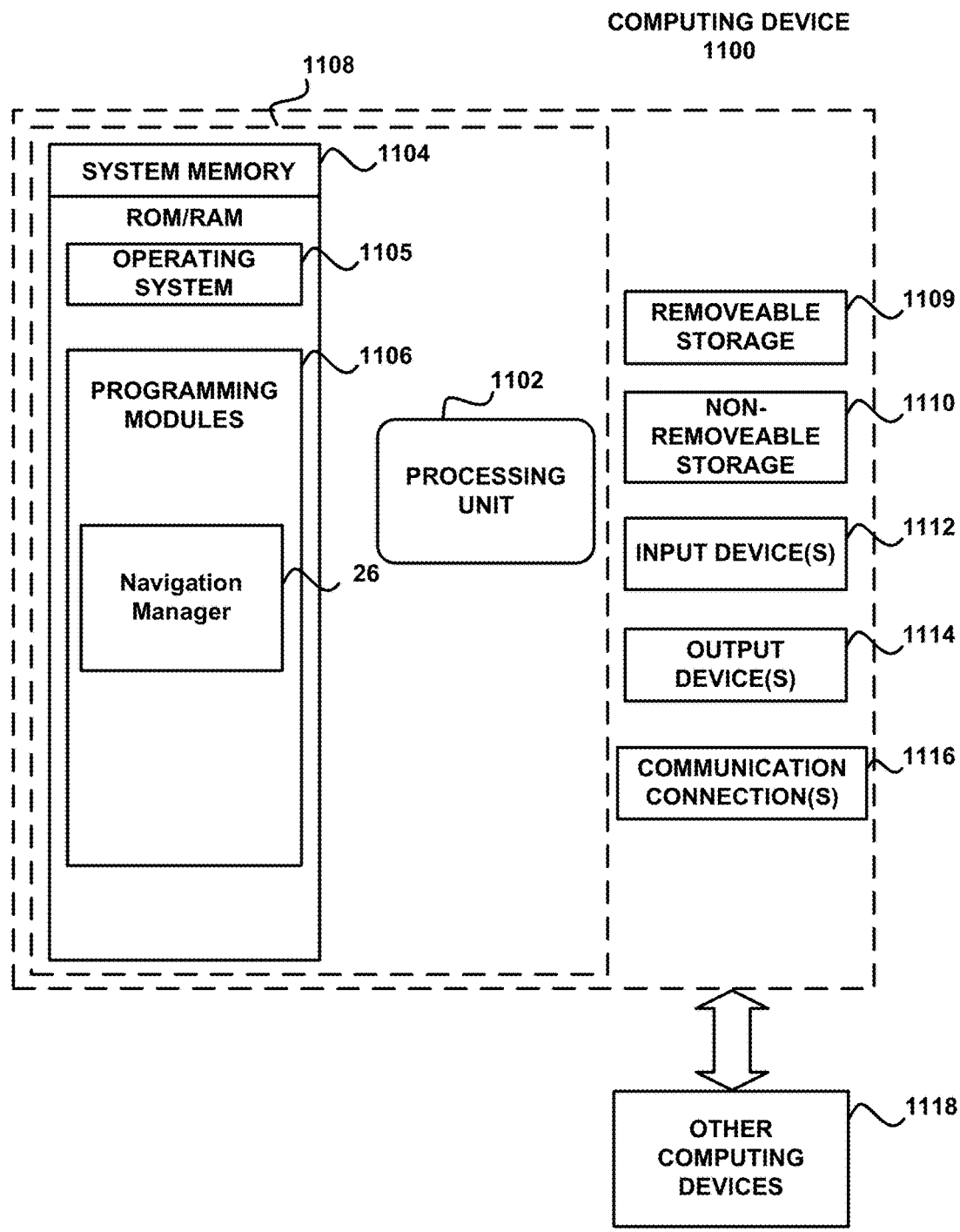
FIGS. 8, 9A, 9B, and 10 and the associated descriptions provide a discussion of a variety of operating environments in which embodiments of the invention may be practiced.
Figure 9A:
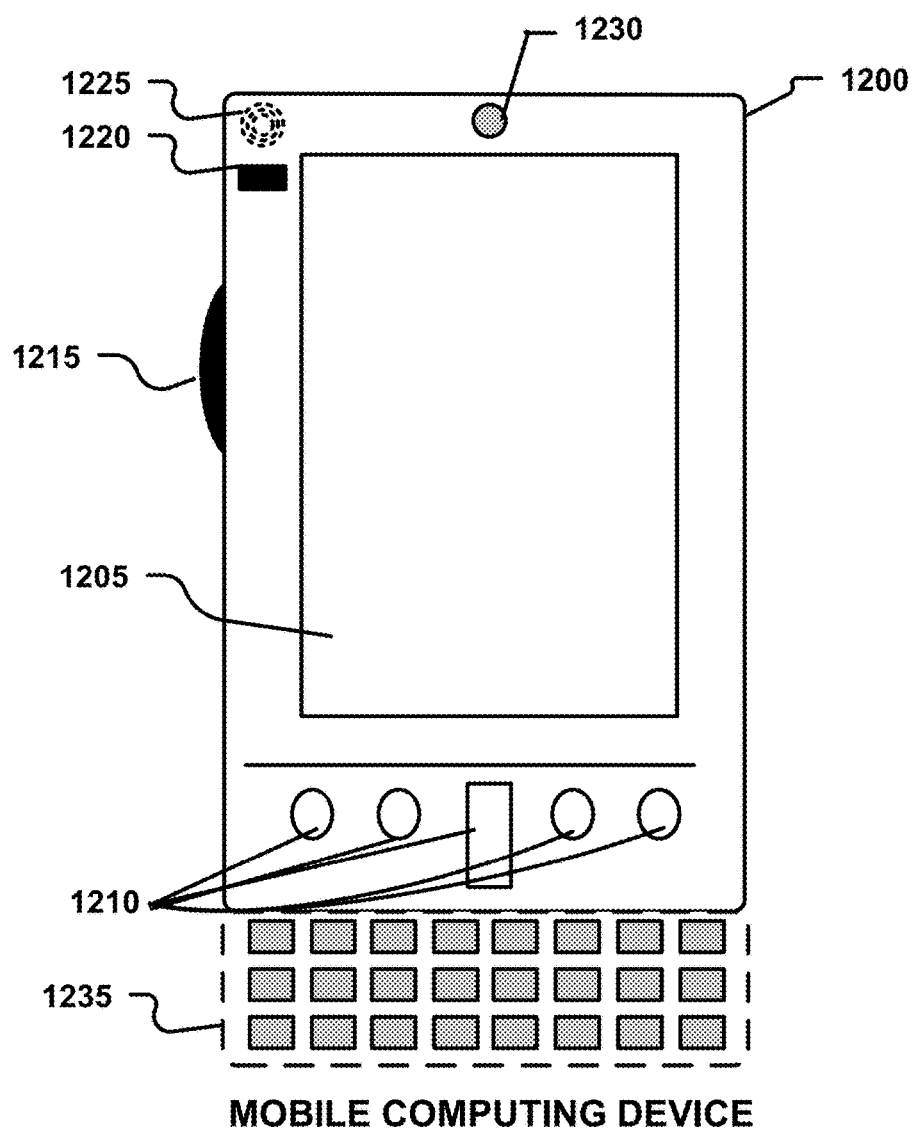
Figure 9B:
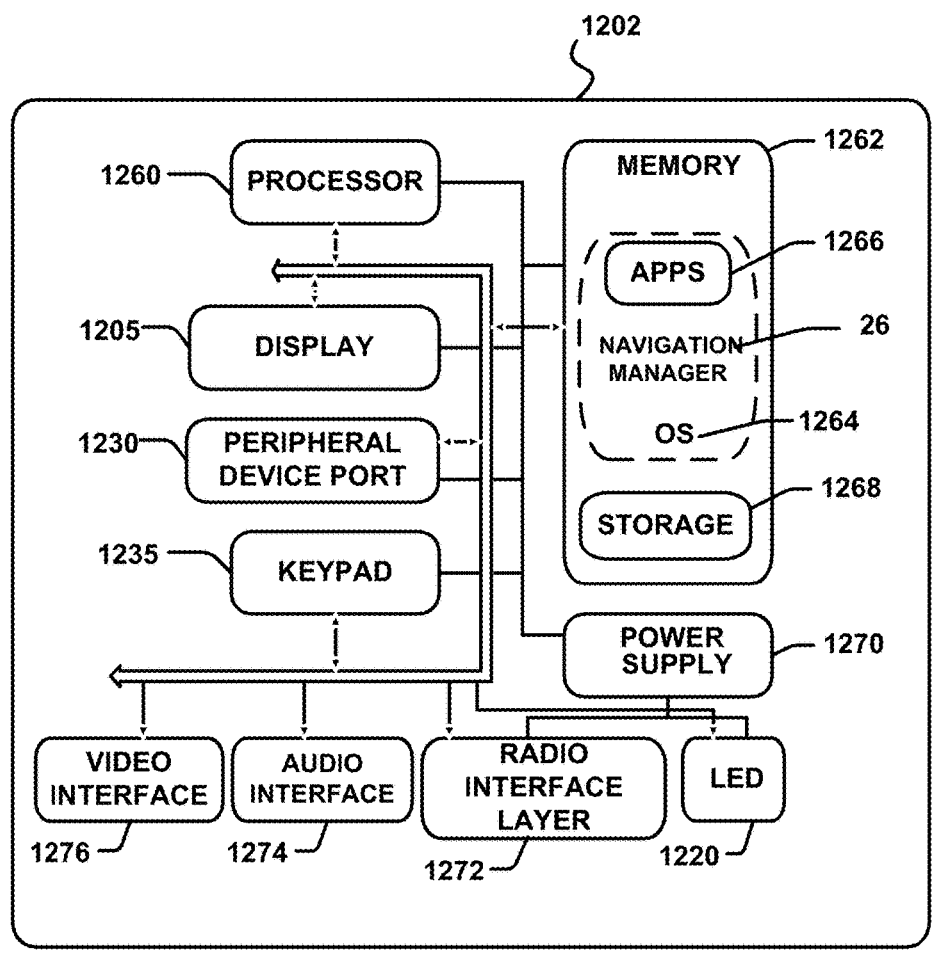
Figure 10:
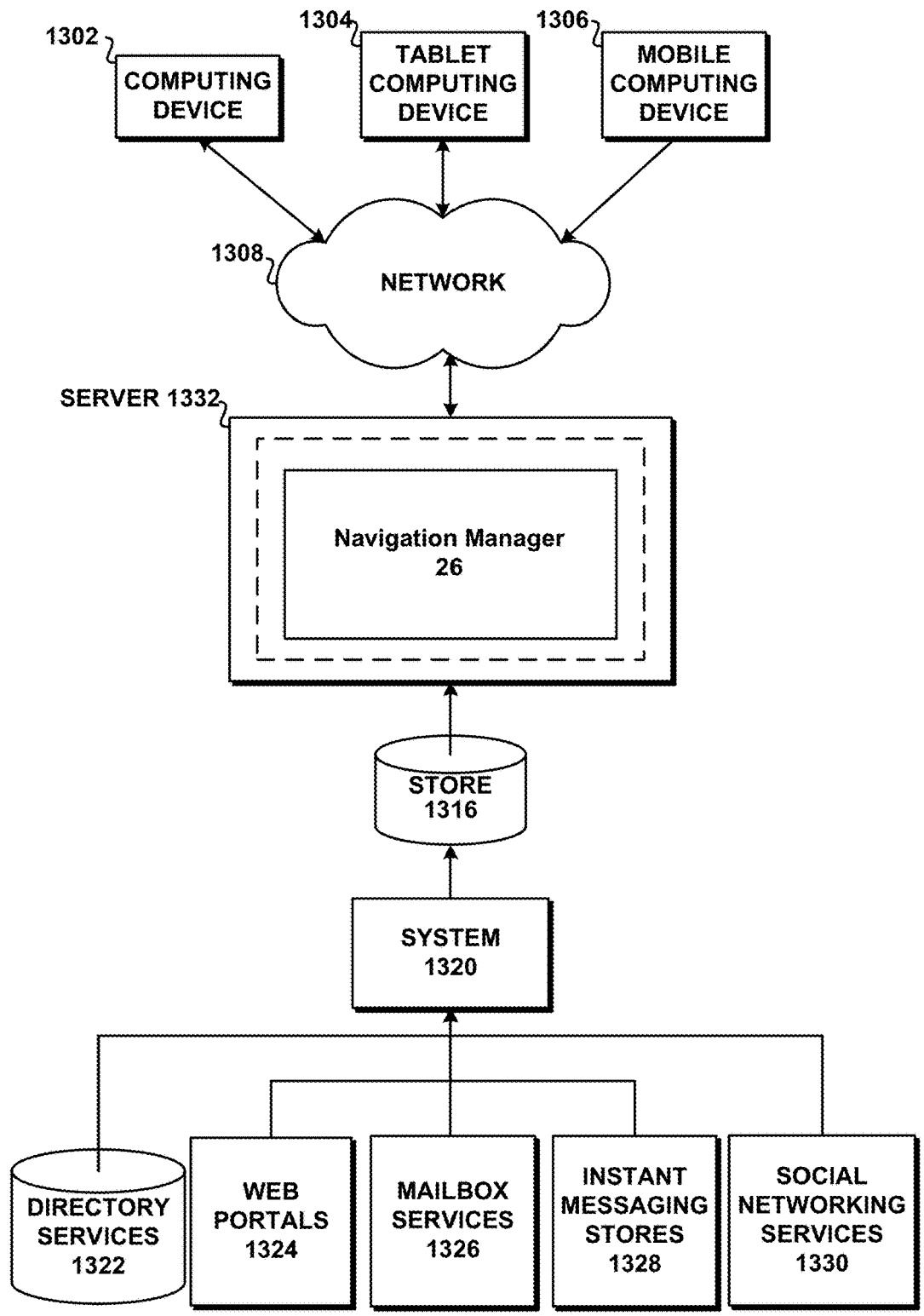

FIGS. 8, 9 and 10 and the associated descriptions provide a discussion of a variety of operating environments in which embodiments of the invention may be practiced. However, the devices and systems illustrated and discussed with respect to FIGS. 8, 9 and 10 are for purposes of example and illustration and are not limiting of a vast number of computing device configurations that may be utilized for practicing embodiments of the invention, described herein.

FIG. 8 is a block diagram illustrating example physical components of a computing device 1100 with which embodiments of the invention may be practiced. The computing device components described below may be suitable for the computing devices described above. In a basic configuration, computing device 1100 may include at least one processing unit 1102 and a system memory 1104. Depending on the configuration and type of computing device, system memory 1104 may comprise, but is not limited to, volatile (e.g. random access memory (RAM)), non-volatile (e.g. read-only memory (ROM)), flash memory, or any combination. System memory 1104 may include operating system 1105, one or more programming modules 1106, and may include a web browser application 1120. Operating system 1105, for example, may be suitable for controlling computing device 1100's operation. In one embodiment, programming modules 1106 may include a navigation manager 26, as described above, installed on computing device 1100. Furthermore, embodiments of the invention may be practiced in conjunction with a graphics library, other operating systems, or any other application program and is not limited to any particular application or system. This basic configuration is illustrated in FIG. 8 by those components within a dashed line 1108.

Computing device 1100 may have additional features or functionality. For example, computing device 1100 may also include additional data storage devices (removable and/or non-removable) such as, for example, magnetic disks, optical disks, or tape. Such additional storage is illustrated by a removable storage 1109 and a non-removable storage 1110.

As stated above, a number of program modules and data files may be stored in system memory 1104, including operating system 1105. While executing on processing unit 1102, programming modules 1106, such as the manager may perform processes including, for example, operations related to methods as described above. The aforementioned process is an example, and processing unit 1102 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the manager 26 may be operated via application-specific logic integrated with other components of the computing device/system 1100 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. System memory 1104, removable storage 1109, and non-removable storage 1110 are all computer storage media examples (i.e., memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1100. Any such computer storage media may be part of device 1100. Computing device 1100 may also have input device(s) 1112 such as a keyboard, a mouse, a pen, a sound input device, a touch input device, etc. Output device(s) 1114 such as a display, speakers, a printer, etc. may also be included. The aforementioned devices are examples and others may be used.

A camera and/or some other sensing device may be operative to record one or more users and capture motions and/or gestures made by users of a computing device. A sensing device may be further operative to capture spoken words, such as by a microphone and/or capture other inputs from a user such as by a keyboard and/or mouse (not pictured). The sensing device may comprise any motion detection device capable of detecting the movement of a user. For example, a camera may comprise a MICROSOFT KINECT® motion capture device comprising a plurality of cameras and a plurality of microphones.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 9A and 9B illustrate a suitable mobile computing environment, for example, a mobile telephone, a smartphone, a tablet personal computer, a laptop computer, and the like, with which embodiments of the invention may be practiced. With reference to FIG. 9A, an example mobile computing device 1200 for implementing the embodiments is illustrated. In a basic configuration, mobile computing device 1200 is a handheld computer having both input elements and output elements. Input elements may include touch screen display 1205 and input buttons 1210 that allow the user to enter information into mobile computing device 1200. Mobile computing device 1200 may also incorporate an optional side input element 1215 allowing further user input. Optional side input element 1215 may be a rotary switch, a button, or any other type of manual input element. In alternative embodiments, mobile computing device 1200 may incorporate more or less input elements. For example, display 1205 may not be a touch screen in some embodiments. In yet another alternative embodiment, the mobile computing device is a portable phone system, such as a cellular phone having display 1205 and input buttons 1210. Mobile computing device 1200 may also include an optional keypad 1235. Optional keypad 1235 may be a physical keypad or a "soft" keypad generated on the touch screen display.

Mobile computing device 1200 incorporates output elements, such as display 1205, which can display a graphical user interface (GUI). Other output elements include speaker 1225 and LED 1220. Additionally, mobile computing device 1200 may incorporate a vibration module (not shown), which causes mobile computing device 1200 to vibrate to notify the user of an event. In yet another embodiment, mobile computing device 1200 may incorporate a headphone jack (not shown) for providing another means of providing output signals.

Although described herein in combination with mobile computing device 1200, in alternative embodiments the invention is used in combination with any number of computer systems, such as in desktop environments, laptop or notebook computer systems, multiprocessor systems, microprocessor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present invention.

FIG. 9B is a block diagram illustrating components of a mobile computing device used in one embodiment, such as the computing device shown in FIG. 9A. That is, mobile computing device 1200 can incorporate system 1202 to implement some embodiments. For example, system 1202 can be used in implementing a "smart phone" that can run one or more applications similar to those of a desktop or notebook computer such as, for example, spreadsheet applications, presentation applications, browser, e-mail, scheduling, instant messaging, and media player applications. In some embodiments, system 1202 is integrated as a computing device, such as an integrated personal digital assistant (PDA) and wireless phoneme.

One or more application 1266 may be loaded into memory 1262 and run on or in association with operating system 1264. Examples of application programs include phone dialer programs, e-mail programs, PIM (personal information management) programs, word processing programs, spreadsheet programs, presentation/slideshow programs, Internet browser programs, messaging programs, and so forth. System 1202 also includes non-volatile storage 1268 within memory 1262. Non-volatile storage 1268 may be used to store persistent information that should not be lost if system 1202 is powered down. Applications 1266 may use and store information in non-volatile storage 1268, such as e-mail or other messages used by an e-mail application, and the like. A synchronization application (not shown) may also reside on system 1202 and is programmed to interact with a corresponding synchronization application resident on a host computer to keep the information stored in non-volatile storage 1268 synchronized with corresponding information stored at the host computer. As should be appreciated, other applications may be loaded into memory 1262 and run on the device 1200, including the navigation manager 26, described above.

System 1202 has a power supply 1270, which may be implemented as one or more batteries. Power supply 1270 might further include an external power source, such as an AC adapter or a powered docking cradle that supplements or recharges the batteries.

System 1202 may also include a radio 1272 that performs the function of transmitting and receiving radio frequency communications. Radio 1272 facilitates wireless connectivity between system 1202 and the "outside world," via a communications carrier or service provider. Transmissions to and from radio 1272 are conducted under control of OS 1264. In other words, communications received by radio 1272 may be disseminated to application 1266 via OS 1264, and vice versa.

Radio 1272 allows system 1202 to communicate with other computing devices, such as over a network. Radio 1272 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 1202 is shown with two types of notification output devices; LED 1220 that can be used to provide visual notifications and an audio interface 1274 that can be used with speaker 1225 to provide audio notifications. These devices may be directly coupled to power supply 1270 so that when activated, they remain on for a duration dictated by the notification mechanism even though processor 1260 and other components might shut down for conserving battery power. LED 1220 may be programmed to remain on indefinitely until the user takes action to indicate the powered-on status of the device. Audio interface 1274 is used to provide audible signals to and receive audible signals from the user. For example, in addition to being coupled to speaker 1225, audio interface 1274 may also be coupled to a microphone to receive audible input, such as to facilitate a telephone conversation. In accordance with embodiments of the present invention, the microphone may also serve as an audio sensor to facilitate control of notifications, as will be described below. System 1202 may further include video interface 1276 that enables an operation of on-board camera 1230 to record still images, video stream, and the like.

A mobile computing device implementing system 1202 may have additional features or functionality. For example, the device may also include additional data storage devices (removable and/or non-removable) such as, magnetic disks, optical disks, or tape. Such additional storage is illustrated in FIG. 9B by storage 1268. Computer storage media may include volatile and nonvolatile, removable and non-removable media implemented in any method or technology for storage of information, such as computer readable instructions, data structures, program modules, or other data.

Data/information generated or captured by the device 1200 and stored via the system 1202 may be stored locally on the device 1200, as described above, or the data may be stored on any number of storage media that may be accessed by the device via the radio 1272 or via a wired connection between the device 1200 and a separate computing device associated with the device 1200, for example, a server computer in a distributed computing network such as the Internet. As should be appreciated such data/information may be accessed via the device 1200 via the radio 1272 or via a distributed computing network. Similarly, such data/information may be readily transferred between computing devices for storage and use according to well-known data/information transfer and storage means, including electronic mail and collaborative data/information sharing systems.

FIG. 10 illustrates a system architecture for a system as described herein.

Components managed via the navigation manager 26 may be stored in different communication channels or other storage types. For example, components along with information from which they are developed may be stored using directory services 1322, web portals 1324, mailbox services 1326, instant messaging stores 1328 and social networking sites 1330. The systems/applications 26, 1320 may use any of these types of systems or the like for enabling management and storage of components in a store 1316. A server 1332 may provide communications and services relating to semantic zoom based navigation. Server 1332 may provide services and content over the web to clients through a network 1308. Examples of clients that may utilize server 1332 include computing device 1302, which may include any general purpose personal computer, a tablet computing device 1304 and/or mobile computing device 1306 which may include smart phones. Any of these devices may obtain display component management communications and content from the store 1316.

Embodiments of the present invention are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for navigating content, comprising:
   displaying a current view of spreadsheet data associated with a workbook including one or more sheets;
   receiving a first gesture to change the current view of the spreadsheet data;
   changing the current view to a thumbnail view of the spreadsheet data that displays at least one thumbnail representing at least one of the sheets of the workbook when the current view is a data view of the spreadsheet data and the first gesture is a zoom instruction that moves the zoom level below a predetermined zoom threshold that indicates to display the thumbnail view of the spreadsheet data as a thumbnail within the workbook;
   changing the current view of the spreadsheet data to a data view of the spreadsheet data when the current view is the thumbnail view of the spreadsheet data displaying the at least one thumbnail representing the at least one or more sheets of the workbook and the first gesture is a zoom instruction that indicates to display the data view of the spreadsheet data;
displaying a graphical object generated from the spreadsheet data, the graphical object including a plurality of sections;
receiving a second gesture;
determining whether the second gesture corresponds to a first command or a second command, the second command being distinct from the first command, wherein the first command corresponds to a gesture performed on the displayed graphical object, and wherein the second command corresponds to a gesture performed adjacent to, but not within the displayed graphical object;
when the second gesture is performed on the displayed graphical object, determining which of the plurality of sections received the second gesture and replacing the display of the graphical object with a display of a respective portion of the spreadsheet data from which the section that received the second gesture was generated; and
when the second gesture is performed adjacent to, but not within the displayed graphical object, replacing the display of the graphical object with a display of the spreadsheet data used to generate all of the plurality of sections of the graphical object.

2. The method of claim 1, wherein changing the current view to the thumbnail view comprises displaying a thumbnail for each sheet of the workbook.

3. The method of claim 1, further comprising determining when the instruction is associated with the object associated with the workbook.

4. The method of claim 3, further comprising changing the current view to display the object in response to a zoom instruction that indicates to display the object.

5. The method of claim 1, wherein receiving the first gesture comprises receiving a stretch gesture and changing a number of thumbnails that are displayed.

6. The method of claim 1, wherein receiving the first gesture comprises receiving a pinch gesture and changing a number of thumbnails that are displayed.

7. The method of claim 1, wherein receiving the first gesture comprises receiving a pan gesture and adjusting a view of the displayed thumbnails.

8. The method of claim 1, wherein receiving the first gesture comprises receiving a selection of one of the thumbnails and in response to receiving the selection exiting the thumbnail view and displaying spreadsheet data that is associated with the sheet represented by the selected thumbnail.

9. A computer-readable storage device, not including any waves or signals, storing computer-executable instructions for navigating content, comprising:
displaying a current view of spreadsheet data associated with a sheet of a workbook; receiving a first gesture to change the current view;
changing the current view to a thumbnail view of the spreadsheet data that displays a thumbnail for each sheet of the workbook when the first gesture is a zoom instruction that moves the zoom level below a predetermined zoom threshold that indicates to display the thumbnail view of the spreadsheet data;
changing the current view of the spreadsheet data to an object view that displays a graphical representation of an object associated with the current view of spreadsheet data when the first gesture is a zoom instruction that indicates to display the object;
displaying a graphical object generated from the spreadsheet data, the graphical object including a plurality of sections;
receiving a second gesture;
determining whether the second gesture corresponds to a first command or a second command, the second command being distinct from the first command, wherein the first command corresponds to a gesture performed on the displayed graphical object, and wherein the second command corresponds to a gesture performed adjacent to, but not within the displayed graphical object;
when the second gesture is performed on the displayed graphical object, determining which of the plurality of sections received the second gesture and replacing the display of the graphical object with a display of a respective portion of the spreadsheet data from which the section that received the second gesture was generated; and
when the second gesture is performed adjacent to, but not within the displayed graphical object, replacing the display of the graphical object with a display of the spreadsheet data used to generate all of the plurality of sections of the graphical object.

10. The computer-readable storage device of claim 9, wherein the second gesture is a zoom instruction.

11. The computer-readable storage device of claim 9, wherein receiving the first gesture comprises receiving a stretch gesture and performing one of: changing a number of thumbnails that are displayed and displaying a data view associated with one of the displayed thumbnails.

12. The computer-readable storage device of claim 9, wherein receiving the first gesture comprises receiving a pinch gesture and performing one of: changing a number of thumbnails that are displayed and changing the current view to a data view.

13. The computer-readable storage device of claim 9, further comprising receiving a pan gesture and adjusting a view of the displayed thumbnails.

14. The computer-readable storage device of claim 9, further comprising receiving a selection of one of the thumbnails and in response to receiving the selection exiting the thumbnail view and displaying spreadsheet data that is associated with the sheet represented by the selected thumbnail.

15. A method for navigating content comprising:
displaying at least one thumbnail view of spreadsheet data associated with a workbook including one or more sheets, wherein each of the at least one thumbnail view represents a different sheet within the workbook;
receiving a first gesture,
when the first gesture is a stretch gesture, increasing the number of thumbnails viewable;
when the first gesture is a pinch gesture, decreasing the number of thumbnails viewable;
displaying a graphical object generated from spreadsheet data of a spreadsheet application, the graphical object including a plurality of sections;
receiving a second gesture;
determining whether the second gesture corresponds to a first command or a second command, the second command being distinct from the first command, wherein the first command corresponds to a gesture performed on the displayed graphical object, and wherein the second command corresponds to a gesture performed adjacent to, but not within the displayed graphical object;

when the second gesture is performed on the displayed graphical object, determining which of the plurality of sections received the first gesture and replacing the display of the graphical object with a display of the respective portion of the spreadsheet data from which the section that received the first gesture was generated; and when the second gesture is performed adjacent to, but not within the displayed graphical object, replacing the display of the graphical object with a display of the spreadsheet data used to generate all of the plurality of sections of the graphical object.

16. The method of claim 15, wherein the graphical object is a pie chart and wherein the plurality of sections comprise a plurality of wedges of the pie chart.

17. The method of claim 15, wherein the graphical object is a bar chart and wherein the plurality of sections comprise a plurality of bars of the bar chart.

18. The method of claim 1, wherein the predetermined zoom threshold is less than 60%.

19. The method of claim 9, wherein the predetermined zoom threshold is less than 60%.

* * * * *